United States Patent [19]
Brayshaw et al.

[11] 3,911,334
[45] Oct. 7, 1975

[54] POTENTIAL MEASURING CAPACITOR

[75] Inventors: Stanier E. Brayshaw; Alan J. Knapp, both of Lynchburg, Va.

[73] Assignee: General Electric Company, Lynchburg, Va.

[22] Filed: Nov. 12, 1974

[21] Appl. No.: 523,040

[52] U.S. Cl. ................. 317/247; 317/242; 317/260
[51] Int. Cl.² .......................................... H01G 1/11
[58] Field of Search..................... 317/242, 247, 260

[56] References Cited
UNITED STATES PATENTS
2,773,226  12/1956  Brooks............................... 317/242
FOREIGN PATENTS OR APPLICATIONS
384,962  12/1932  United Kingdom................. 317/260

Primary Examiner—E. A. Goldberg

[57] ABSTRACT

Potential measuring capacitors for high voltage power lines typically comprise a stack of individual capacitor elements connected in series and provided with a high voltage lead connected to the individual capacitor element at the top of the series, a ground lead connected to the individual capacitor element at the bottom of the series, and an intermediate lead connected to an intermediate point in the series. The intermediate lead divides the series into a first or upper capacitor C1 between the intermediate and high voltage leads and a second or lower capacitor C2 between the intermediate and ground leads. The stack is divided by a mechanical barrier that supports the upper capacitor so that there is no weight pressure from the upper capacitor on the lower capacitor. With this arrangement, the temperature coefficient of the first or upper capacitor C1 is substantially equal to the temperature coefficient of the second or lower capacitor C2, so that a more accurate voltage measurement over a wider range of temperatures is provided.

7 Claims, 3 Drawing Figures

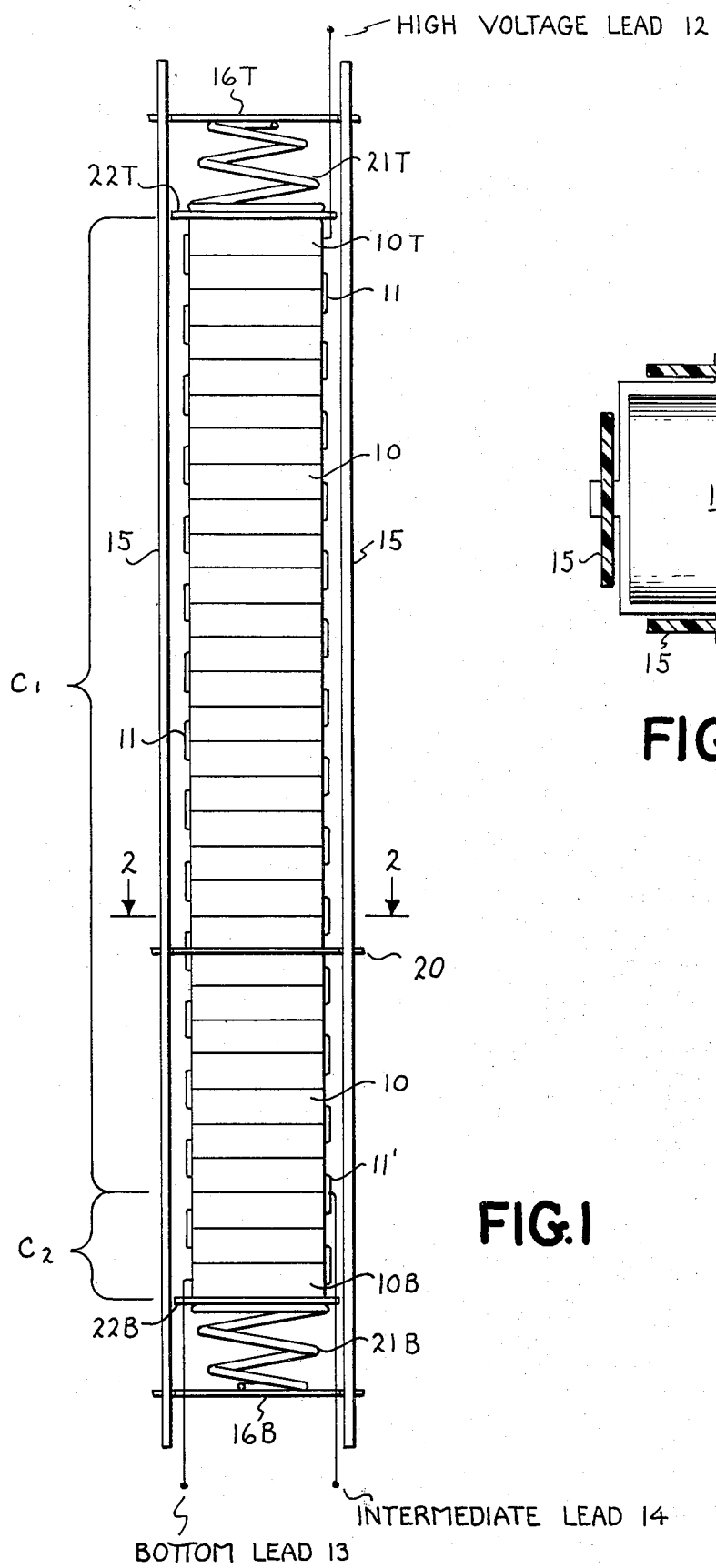
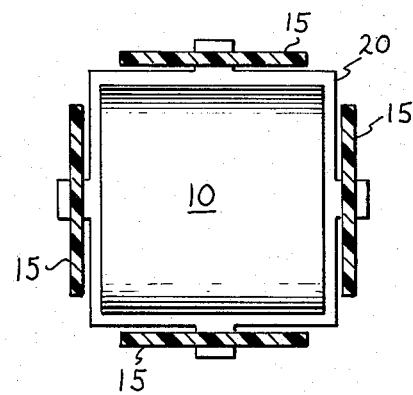
FIG.2
FIG.1

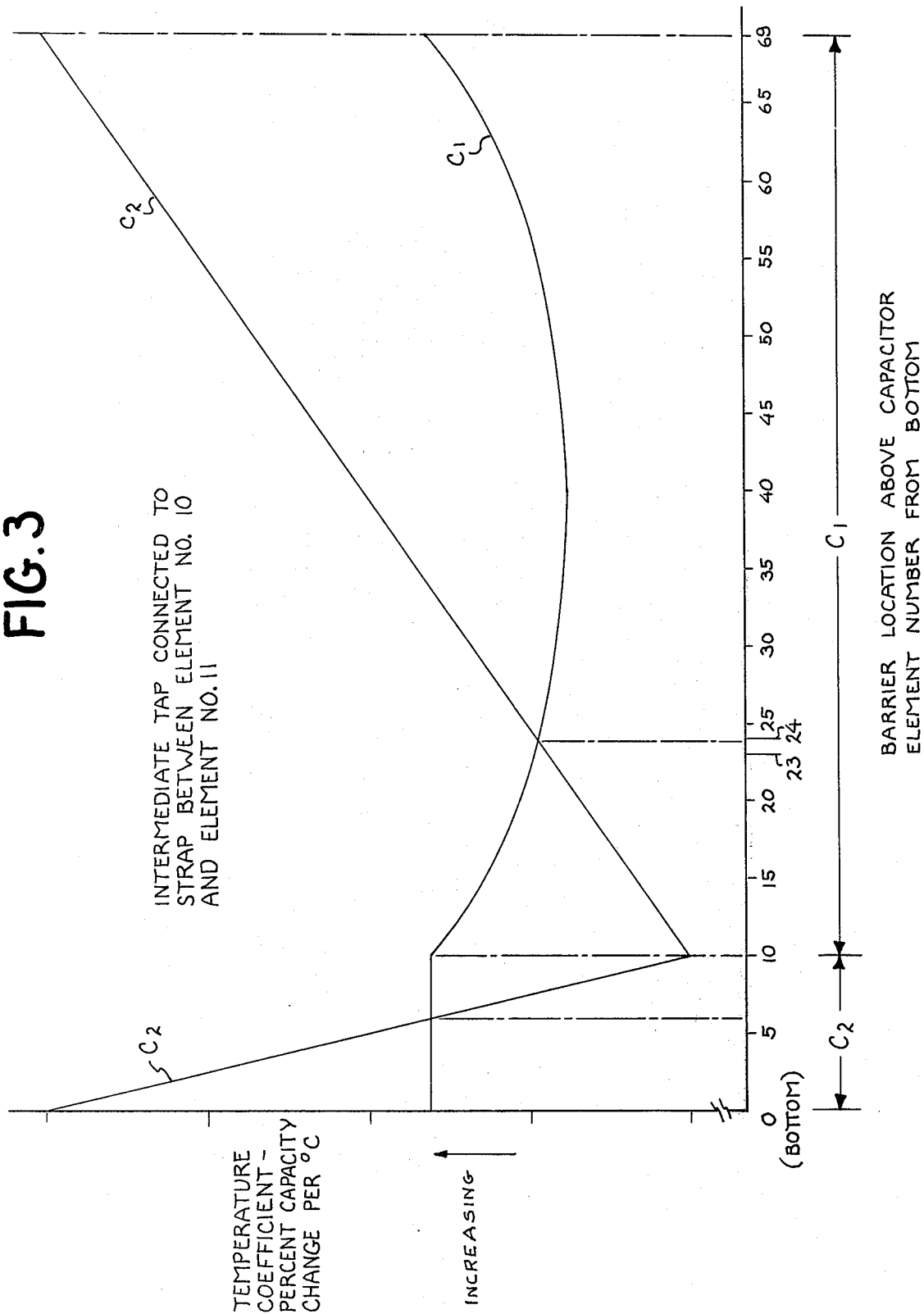

POTENTIAL MEASURING CAPACITOR

BACKGROUND OF THE INVENTION

Our invention relates to a potential measuring capacitor, and particularly to a potential measuring capacitor having improved temperature characteristics.

A capacitor arrangement is frequently used to provide means for measuring high voltages, particularly on 60 hertz power lines. Such an arrangement typically comprises a plurality of individual capacitor elements stacked in a container (usually a cylindrical insulator) and connected in series. The top capacitor element in the series is provided with an external lead for connection to the high voltage source, and the bottom capacitor element in the series is provided with an external lead for connection to a point of reference potential or ground. An intermediate point in the series (usually nearer the bottom capacitor element) is provided with an external intermediate lead so that a first (upper) capacitor C1 is formed between the intermediate lead and the top lead, and so that a second (lower) capacitor C2 is formed between the intermediate lead and the bottom lead. The high voltage between the source and ground can be found by multiplying the measured voltage between the intermediate lead and ground by the term or ratio $$\left(\frac{C1+C2}{C1}\right),$$

where C1 and C2 are the magnitudes of the capacitors C1 and C2. In addition, the arrangement may also be used for coupling signals (from about 30 kilohertz and higher) to power lines. This arrangement performs its functions well, but does have one disadvantage. Because of the necessity of measuring voltages in the tens or hundreds of kilovolts, many individual capacitor elements must be connected in series to provide the needed voltage withstanding characteristics. When stacked, the weight of the capacitor elements subjects the lower capacitor elements to considerable pressure, and hence causes them to have a greater temperature coefficient (the percent change in capacity as a function of temperature). Hence in the multiplying term $$\left(\frac{C1+C2}{C1}\right)$$

given above, the magnitude of the upper capacitor C2 changes more than the magnitude of the upper capacitor C1 for a given change in temperature, so that the multiplying term is precisely accurate at only its calibrated temperature. But since such capacitors must function between relatively wide temperature ranges (for example −45°C to +45°C), a more accurate potential measuring capacitor is needed, particularly where the measured voltage is used to determine power consumption for revenue measuring or to provide a voltage that performs some function such as switching.

Accordingly, a primary object of our invention is to provide an improved high voltage measuring capacitor.

Another object of our invention is to provide a new and improved potential measuring capacitor that is less sensitive to temperature changes.

Another and fairly specific object of our invention is to provide a new and improved potential measuring capacitor that uses a stack of capacitor elements to form a capacitor C1 and a capacitor C2 which have substantially equal or more nearly equal temperature coefficients.

SUMMARY OF THE INVENTION

Briefly, these and other objects are achieved in accordance with our invention by a capacitor arrangement having a plurality of stacked-up individual capacitor elements which are electrically connected in series to provide the desired voltage characteristics. Leads are respectively connected to the top capacitor element in the series, an intermediate point in the series, and the bottom capacitor element in the series. A mechanical barrier is positioned between two elements, preferably at a location above the intermediate point, so as to support the capacitor elements above the mechanical barrier, and thereby relieve the capacitor elements below the mechanical barrier from pressure resulting from the weight of the elements above the support. Reduction of the pressure on the elements below the barrier makes the capacitor between the intermediate and bottom leads less sensitive to temperature. Spring loading can be provided to maintain constant pressure on the capacitor elements above and below the mechanical barrier. The precise location of the mechanical barrier can be chosen so that the temperature coefficient of the capacitor between the intermediate and top leads is substantially equal to the temperature coefficient of the capacitor between the intermediate and bottom leads. Under these conditions, the multiplying term used for indicating the high voltage is substantially independent of changes in temperature. And of course, the arrangement can be housed in any suitable container, such as an insulator.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

FIG. 1 shows an elevation view of a capacitor constructed in accordance with our invention;

FIG. 2 shows an enlarged sectional view of our capacitor, taken along the lines 2—2 of FIG. 1; and FIG. 3 shows graphs illustrating how a capacitor in accordance with our invention may be designed.

DESCRIPTION OF THE PREFERRED EMBODIMENT

FIGS. 1 and 2 show elevation and sectional views respectively of a capacitor constructed in accordance with our invention. Typically, such a capacitor comprises a plurality of individual rolls or elements 10 formed of thin metallic foil and dielectric material, such as paper. The foil and dielectric material are provided in elongated strip form. Two strips of foil, separated by a strip of dielectric material and also covered by a strip of dielectric material, are wound in flat, roll-like form in a convenient size that provides the desired capacity. The two strips of foil serve as the two plates of the capacitor, separated by the dielectric material.

Leads are provided to the two strips of foil to provide an electrical connection to the individual capacitor element 10 so formed. A plurality of such elements 10 are stacked up as shown in FIG. 1, and a terminal of each such capacitor element 10 is connected to a terminal of the next adjacent capacitor element 10 by suitable leads or straps 11 to form a capacitor having the desired voltage characteristics. A lead 12 is connected to the outer terminal of the top element 10T and brought out for connection to the high voltage source to be measured. A lead 13 is connected to the outer terminal of the bottom element 10B and brought out for connection to a point of reference potential or ground. An intermediate lead 14 is connected to an intermediate point or strap 11' to electrically divide the series arrangement of capacitors into a first or upper capacitor C1 and a second or lower capacitor C2. When this arrangement is used, the high voltage lead 12 is connected to the source of high voltage, and the bottom lead 13 is connected to the point of reference potential or ground. The voltage between the intermediate lead 14 and the bottom lead 13 is measured, and is then multiplied by the term or ratio $$\left(\frac{C1 + C2}{C1}\right)$$

to give a measurement or indication of the voltage between the high voltage lead 12 and the bottom lead 13.

The arrangement described is mechanically supported in its stacked configuration by elongated insulating bars or plates 15 arranged around the four sides of the capacitor elements 10 as shown. These elongated bars 15 are securely fastened at the top and bottom by end plates 16T, 16B to form a rigid, self-supporting, semi-contained structure. This structure is usually placed inside a cylindrical insulator, and the leads 12, 13, 14 are brought out for connection. The insulator is then filled with a suitable dielectric liquid, such as oil, and then sealed at its ends to provide a completely contained, weatherproof structure.

The structure as described thus far is known in the art, and has provided relatively satisfactory means for measuring high voltages, and for providing means for coupling radio frequency signal systems, operating in the kilohertz region, to power lines. However, consideration of this arrangement, particularly FIG. 1, will show that if the stack of capacitor elements 10 becomes relatively high, as it frequently does when very high voltages being measured require a large number of capacitor elements, the weight of the stack becomes appreciable. This weight causes the pressure on each successivley lower element 10 to become greater. As is known, the capacity and the temperature coefficient of capacity (that is the percent change in capacity as a function of temperature) are both dependent upon the pressure exerted upon each of the capacitor elements 10. Thus, if the voltage measuring capacitor is calibrated at a reference temperature, such as +20°C, for the ratio of the first capacitor C1 and the second capacitor C2, as the temperature deviates from this reference temperature, then the ratio changes in an undesired manner. In particular, the magnitude of the capacitor C2 changes much more rapidly with temperature, since the elements 10 forming the capacitor C2 are subject to the greater weight and hence pressure. After consideration, we found that if some means could be provided to make the temperature coefficient of the capacitor C1 equal to the temperature coefficient of the capacitor C2, then the multiplying term would be substantially constant for a relatively large change in temperature.

To achieve this, we have provided a mechanical barrier 20 which is positioned in the stack of capacitor elements 10 in such a manner as to divide the stack into an upper section and a lower section, without disturbing the electrical arrangement of the series of capacitor elements 10. The barrier 20 supports the elements 10 in the upper section so that the elements 10 in the lower section are relieved of weight and pressure resulting from the elements 10 in the upper section. The barrier 20 is securely fastened to the four bars 15 to provide rigid support to the elements 10 in the upper section. And, to provide a more stable and constant pressure, we provide top and bottom movable plates 22T, 22B and compression springs 21T, 21B which bear against the fixed top and bottom plates 16T, 16B respectively to provide spring loading against the top capacitor element 10T and the bottom capacitor element 10B respectively. The plates 22T, 22B are preferably slidably positioned within the bars 15 to provide a good bearing surface for the springs 21T, 21B respectively to press the elements 10 toward the barrier 20.

The location of the barrier 20 is selected so that the temperature coefficient of the capacitor C1 is equal or very nearly equal to the temperature coefficient of the capacitor C2. This location can be determined by empirical methods which are explained below. Generally, the temperature coefficient of a capacitor element, such as shown in FIG. 1, varies in a substantially linear manner with pressure. Thus, an element at the bottom of a stack would have a temperature coefficient that is substantially greater than the temperature coefficient of an element at the mid-point of a stack. With this approach, graphs showing the temperature coefficient of the capacitor C1 and the temperature coefficient of the capacitor C2 as a function of the location of the barrier can be plotted using mathematical approximations and experimental observations. Such a graph is shown in FIG. 3 for a capacitor arrangement having a total of 69 capacitor elements, with the intermediate point (such as the point 11' of FIG. 1) positioned between the tenth and eleventh elements numbered from the bottom. Thus, the capacitor C1 comprises the upper 59 elements, and the capacitor C2 comprises the lower 10 elements.

The bottom capacitor C2 has a temperature coefficient which varies as a function of barrier location as shown by the graph bearing the legend C2. If the barrier is positioned at the very bottom of the stack, then all of the elements will be pressing on the elements forming the capacitor C2, and the capacitor C2 will have a maximum temperature coefficient as shown at the upper left. As the barrier is moved upward, the pressure on the elements forming the capacitor C2 is reduced, so that the temperature coefficient reaches a minimum when the barrier is above element number 10 (the top one in the capacitor C2). At this point, no pressure from the upper elements is applied to the ten elements forming the capacitor C2. However, as the barrier is moved further upward, additional elements then bear on or press on the elements forming the capacitor C2 so that its temperature coefficient increases as shown by the right hand portion of the graph. The temperature coefficient again reaches the same maximum when the barrier is above element number 69, this being the condition that again permits all of the upper elements to press on the ten elements forming the capacitor C2.

With respect to the capacitor C1, the temperature coefficient varies as shown by the graph bearing the legend C1. It will be readily appreciated that if the barrier is positioned anywhere between the elements forming the capacitor C2, no pressure relief is provided on the upper 59 elements forming the capacitor C1. Hence for this position, its temperature coefficient is constant as indicated by the horizontal straight line portion at the left of the graph C1. However, as soon as the barrier is positioned above the eleventh element, some pressure relief is provided as indicated by the downwardly sloping portion of the graph C1. The temperature coefficient reaches a minimum at the midpoint location of the elements forming the capacitor C1, which occurs approximately at element number 40. Capacitor C1 comprises 59 elements, so that the midpoint would be approximately at element number 30 of the C1 elements. If the 10 elements forming the capacitor C1 are considered or counted, the mid-point would occur at element number 40 in the full stack. As the barrier is moved upward, the pressure on the lower elements in the capacitor C1 becomes greater with the result that its temperature coefficient increases as indicated by the right hand portion of the graph C1 which slopes upward. And, it will be readily apparent that when the barrier is positioned above element number 69, the same maximum pressure is again present for all of the elements of the capacitor C1 as it was when the barrier was below element number 11.

An examination of the graphs C1, C2 in FIG. 3 shows that there are two barrier locations at which the temperature coefficients are equal. One occurs when the barrier is located approximately above element 6, and the other occurs when the barrier location is approximately above element 24. Either of these locations would be satisfactory, but the barrier location above element 24 is preferred since the temperature coefficient for the capacitor C2 varies more gradually here than it does at the other location. Actually, the graphs C1, C2 do not necessarily cross precisely at a barrier location above an element, so that the barrier must be either located above or below this crossing point. In the case of the graphs in FIG. 3, this location could be either above element 23 or above element 24. However, in either case, considerably improved temperature coefficients are provided over a fairly wide range of temperatures, so that the voltage multiplying term $$\left(\frac{C1+C2}{C1}\right)$$

provides relatively accurate measurements.

It will thus be seen that we have provided a new and improved potential measuring capacitor that has more stable temperature coefficients, so that the capacitor provides more accurate voltage measurements. Our arrangement is relatively simple in that it only requires a mechanical barrier in a structure which, in most instances, is already provided in terms of elongated bars and other structural elements that hold a capacitor stack. Persons skilled in the art will appreciate that many forms of the barrier 20 may be provided, depending upon preferred mechanical designs and manufacturing considerations. While we prefer the loading springs 21T, 21B, these springs may, if desired, be omitted. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An improved capacitor for use with high voltage lines and the like, comprising:
   a. an elongated structure for said capacitor;
   b. a plurality of individual capacitors stacked within said structure, said plurality of individual capacitors being electrically connected in series to provide the desired voltage characteristic;
   c. leads respectively connected to the top capacitor of said series, an intermediate point in said series, and the bottom capacitor of said series for external electrical connections;
   d. and a mechanical barrier positioned within said structure between two of said individual capacitors at a location above said intermediate point for supporting the capacitors above said mechanical barrier so that the capacitors below said mechanical barrier receive no pressure from said capacitors above said mechanical barrier.

2. The improved capacitor of claim 1 wherein said mechanical barrier is securely fastened to said structure at said location.

3. The improved capacitor of claim 1, and further comprising compression spring loading for said capacitors above said mechanical barrier, and compression spring loading for said capacitors below said mechanical barrier.

4. An improved potential measuring capacitor for use with high voltage lines and the like, comprising:
   a. an elongated insulator having sides fitted with a top and bottom to form a closed container;
   b. a plurality of serially connected electrical capacitor elements stacked within said container;
   c. leads respectively connected to the top capacitor element, an intermediate point, and the bottom capacitor element of said serially connected capacitor elements to provide a capacitor C1 between said top and intermediate leads and to provide a capacitor C2 between said intermediate and bottom leads;
   d. and a mechanical barrier mounted within said container and positioned at a location so that the capacitor elements above said barrier do no exert pressure on the capacitor elements below said support and so that the temperature coefficient of said capacitor C1 is substantially equal to the temperature coefficient of said capacitor C2.

5. The improved capacitor of claim 4, and further comprising compression spring loading for said capacitor elements above said mechanical barrier, and compression spring loading for said capacitor elements below said mechanical barrier.

6. The improved capacitor of claim 4 wherein said mechanical barrier location is between selected elements forming said capacitor C1.

7. The improved capacitor of claim 6, and further comprising compression spring loading for said capacitor elements above said mechanical barrier, and compression spring loading for said capacitor elements below said mechanical barrier.

* * * * *

UNITED STATES PATENT OFFICE
CERTIFICATE OF CORRECTION

PATENT NO. : 3,911,334

DATED : October 7, 1975

INVENTOR(S) : S.E. Brayshaw & A.J. Knapp

It is certified that error appears in the above-identified patent and that said Letters Patent are hereby corrected as shown below:

Col. 3, line 53, cancel "successivley" and insert -- successively --

Col. 5, line 24, cancel "C1" and insert -- C2 --

Signed and Sealed this

Twenty-second Day of March 1977

[SEAL]

Attest:

RUTH C. MASON
Attesting Officer

C. MARSHALL DANN
Commissioner of Patents and Trademarks